United States Patent
Tanaka

(10) Patent No.: US 10,566,628 B2
(45) Date of Patent: Feb. 18, 2020

(54) SLURRY FOR LITHIUM ION SECONDARY BATTERY POSITIVE ELECTRODE-USE, METHOD FOR PRODUCING SLURRY FOR LITHIUM ION SECONDARY BATTERY POSITIVE ELECTRODE-USE, METHOD FOR PRODUCING POSITIVE ELECTRODE FOR LITHIUM ION SECONDARY BATTERY-USE, AND LITHIUM ION SECONDARY BATTERY

(71) Applicant: ZEON CORPORATION, Chiyoda-ku, Tokyo (JP)

(72) Inventor: Keiichiro Tanaka, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 36 days.

(21) Appl. No.: 15/128,527

(22) PCT Filed: Apr. 2, 2015

(86) PCT No.: PCT/JP2015/001894
§ 371 (c)(1),
(2) Date: Sep. 23, 2016

(87) PCT Pub. No.: WO2015/151529
PCT Pub. Date: Oct. 8, 2015

(65) Prior Publication Data
US 2017/0110734 A1    Apr. 20, 2017

(30) Foreign Application Priority Data
Apr. 2, 2014   (JP) ................ 2014-076320

(51) Int. Cl.
| | |
|---|---|
| H01M 4/62 | (2006.01) |
| H01M 4/525 | (2010.01) |
| H01M 4/04 | (2006.01) |
| H01M 4/36 | (2006.01) |
| H01M 10/0525 | (2010.01) |
| C09D 7/61 | (2018.01) |
| C09D 5/24 | (2006.01) |
| C09D 127/16 | (2006.01) |
| C09D 133/20 | (2006.01) |
| C09D 147/00 | (2006.01) |
| H01M 4/02 | (2006.01) |

(52) U.S. Cl.
CPC .............. *H01M 4/623* (2013.01); *C09D 5/24* (2013.01); *C09D 7/61* (2018.01); *C09D 127/16* (2013.01); *C09D 133/20* (2013.01); *C09D 147/00* (2013.01); *H01M 4/0404* (2013.01); *H01M 4/366* (2013.01); *H01M 4/525* (2013.01); *H01M 4/625* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2009/0202892 | A1 | 8/2009 | Inagaki et al. |
| 2014/0121329 | A1 | 5/2014 | Araki et al. |
| 2015/0010784 | A1* | 1/2015 | Takahata ........... H01M 10/0525 429/7 |
| 2015/0050554 | A1 | 2/2015 | Fukumine et al. |

FOREIGN PATENT DOCUMENTS

| | | |
|---|---|---|
| EP | 1267431 A1 | 12/2002 |
| JP | H08236114 A | 9/1996 |
| JP | 2001143703 A | 5/2001 |
| JP | 2003007299 A | 1/2003 |
| JP | 2008311132 A | 12/2008 |
| JP | 2009187834 A | 8/2009 |
| JP | 2010123437 A | 6/2010 |
| JP | 2011159421 A | 8/2011 |
| JP | 2012099251 A | 5/2012 |
| JP | 2012204303 A | 10/2012 |
| JP | 2013008485 A | 1/2013 |
| JP | 2014002984 A | 1/2014 |
| WO | 2012165120 A1 | 12/2012 |
| WO | 2013080989 A1 | 6/2013 |

OTHER PUBLICATIONS

Jun. 23, 2015, International Search Report issued in the International Patent Application No. PCT/JP2015/001894.
Oct. 4, 2016, International Preliminary Report on Patentability issued in the International Patent Application No. PCT/JP2015/001894.

* cited by examiner

*Primary Examiner* — Carmen V Lyles-Irving
(74) *Attorney, Agent, or Firm* — Kenja IP Law PC

(57) ABSTRACT

Provided is a slurry for lithium ion secondary battery positive electrode-use that includes a positive electrode active material, a binding material, a conductive material, and an organic solvent. The positive electrode active material is a lithium cobalt-based composite oxide particle having an oxide of at least one metal selected from the group consisting of Mg, Ca, Al, B, Ti, and Zr on its surface. The binding material includes a polymer (P1) and a fluorine-containing polymer (P2). The polymer (P1) includes a nitrile group-containing monomer unit, a (meth)acrylic acid ester monomer unit, and an alkylene structural unit having a carbon number of at least 4, and does not substantially include a hydrophilic group-containing monomer unit.

6 Claims, No Drawings

SLURRY FOR LITHIUM ION SECONDARY BATTERY POSITIVE ELECTRODE-USE, METHOD FOR PRODUCING SLURRY FOR LITHIUM ION SECONDARY BATTERY POSITIVE ELECTRODE-USE, METHOD FOR PRODUCING POSITIVE ELECTRODE FOR LITHIUM ION SECONDARY BATTERY-USE, AND LITHIUM ION SECONDARY BATTERY

TECHNICAL FIELD

The present disclosure relates to a slurry for lithium ion secondary battery positive electrode-use, a method for producing a slurry for lithium ion secondary battery positive electrode-use, a method for producing a positive electrode for lithium ion secondary battery-use, and a lithium ion secondary battery.

BACKGROUND

Lithium ion secondary batteries have characteristics such as compact size, light weight, high energy-density, and the ability to be repeatedly charged and discharged, and are used in a wide variety of applications. Consequently, in recent years, studies have been made to improve battery members such as electrodes for the purpose of achieving even higher lithium ion secondary battery performance.

A positive electrode for a secondary battery such as a lithium ion secondary battery generally includes a current collector and a positive electrode mixed material layer formed on the current collector. The positive electrode mixed material layer is formed, for example, by applying, onto the current collector, a slurry in which a positive electrode active material, a conductive material, a binding material, and so forth are dissolved or dispersed in water, an organic solvent, or the like, and drying the applied slurry. In recent years, there have been attempts to improve positive electrode active materials and binding materials in order to further improve dispersion stability of slurries used to form secondary batteries and electrical characteristics of secondary batteries.

For example, PTL 1 proposes improving cycle characteristics, thermal stability, and so forth of a secondary battery by using, as a positive electrode active material, a powder of lithium cobalt oxide particles that contain Zr in a specific content ratio and that are coated with a Zr compound represented by a specific chemical formula. Specifically, PTL 1 proposes improving cycle characteristics, thermal stability, and so forth of a secondary battery by using a positive electrode that is formed using a slurry containing the aforementioned positive electrode active material, a conductive material such as acetylene black, and a binding material such as polyvinylidene fluoride.

In another example, PTL 2 proposes improving stability of a slurry for a positive electrode of a secondary battery and also improving cycle characteristics of a secondary battery by using, as a binding material, a polymer that includes a nitrile group-containing monomer unit, a (meth)acrylic acid ester monomer unit, a hydrophilic group-containing monomer unit, and a straight chain alkylene structural unit having a carbon number of at least 4, and that exhibits a degree of swelling of from 100% to 500% with respect to a specific electrolysis solution.

CITATION LIST

Patent Literature

PTL 1: JP 2008-311132 A
PTL 2: WO 2013/080989 A1

SUMMARY

Technical Problem

In the field of lithium ion secondary batteries, there has been increasing demand in recent years for improving dispersion stability of slurries used to form positive electrodes of lithium ion secondary batteries (slurries for lithium ion secondary battery positive electrode-use) and for improving electrical characteristics of lithium ion secondary batteries. Particularly in the case of electrical characteristics, there is demand for lithium ion secondary batteries that, for example, exhibit excellent cycle characteristics even under a high charging voltage in order that such lithium ion secondary batteries are compatible with various applications such as use in electric vehicles.

However, in the case of a lithium ion secondary battery that includes a positive electrode formed using a slurry containing the positive electrode active material in PTL 1 described above, it has not been possible to obtain satisfactory cycle characteristics under a high charging voltage (high-voltage cycle characteristics) since repeated charging and discharging at high-voltage leads to formation of cracks in the positive electrode active material and promotes deterioration of an electrolysis solution.

Furthermore, in the case of a slurry containing the binding material in PTL 2 described above, it has not been possible to ensure sufficient dispersion stability, particularly when a conductive material having a large specific surface area is used, since the conductive material tends to aggregate, leading to loss of dispersion stability of the slurry for positive electrode-use. Moreover, it has not been possible to ensure that a lithium ion secondary battery including a positive electrode formed using this slurry for positive electrode-use has adequate electrical characteristics (in particular, output characteristics).

Consequently, there is still room for improving the conventional slurries for lithium ion secondary battery positive electrode-use described above in terms of ensuring excellent dispersion stability while also enabling a lithium ion secondary battery to exhibit excellent high-voltage cycle characteristics and output characteristics.

Therefore, one objective of the present disclosure is to provide a slurry for lithium ion secondary battery positive electrode-use that has excellent dispersion stability and that can be used to form a positive electrode that enables a lithium ion secondary battery to exhibit excellent high-voltage cycle characteristics and output characteristics.

Another objective of the present disclosure is to provide a method for producing a slurry for lithium ion secondary battery positive electrode-use that has excellent dispersion stability and that can be used to form a positive electrode that enables a lithium ion secondary battery to exhibit excellent high-voltage cycle characteristics and output characteristics.

Yet another objective of the present disclosure is to provide a method for producing a positive electrode for lithium ion secondary battery-use that enables a lithium ion secondary battery to exhibit excellent high-voltage cycle characteristics and output characteristics, and to provide a lithium ion secondary battery including a positive electrode that is produced through this production method.

Solution to Problem

The inventor conducted diligent investigation with the objective of solving the problems described above. The inventor discovered that in a situation in which a slurry for lithium ion secondary battery positive electrode-use is produced using a polymer having a specific repeating unit composition and a fluorine-containing polymer in combination as a binding material, and using a lithium cobalt-based composite oxide particle having an oxide of a specific metal element on its surface as a positive electrode active material, it is possible to ensure that the slurry for positive electrode-use has excellent dispersion stability while also improving high-voltage cycle characteristics and output characteristics of a lithium ion secondary battery that includes a positive electrode formed using the aforementioned slurry for positive electrode-use. This discovery led to the present disclosure.

Specifically, in order to advantageously solve the problems described above, a presently disclosed slurry for lithium ion secondary battery positive electrode-use comprises a positive electrode active material, a binding material, a conductive material, and an organic solvent, wherein the positive electrode active material is a lithium cobalt-based composite oxide particle having an oxide of at least one metal selected from the group consisting of Mg, Ca, Al, B, Ti, and Zr on its surface, the binding material includes a polymer (P1) and a fluorine-containing polymer (P2), and the polymer (P1) includes a nitrile group-containing monomer unit, a (meth)acrylic acid ester monomer unit, and an alkylene structural unit having a carbon number of at least 4, and does not substantially include a hydrophilic group-containing monomer unit. As a result of the lithium cobalt-based composite oxide particle that has the oxide of any of the aforementioned metals on its surface being used as the positive electrode active material, and the polymer (P1) and the fluorine-containing polymer (P2) being used in combination as the binding material, it is possible to ensure that the slurry for lithium ion secondary battery positive electrode-use has excellent dispersion stability while also providing a lithium ion secondary battery that includes a positive electrode formed using this slurry for positive electrode-use with excellent high-voltage cycle characteristics and output characteristics.

In the presently disclosed slurry for lithium ion secondary battery positive electrode-use, the conductive material preferably has a specific surface area of at least 700 $m^2/g$. The reason for this is that output characteristics of the lithium ion secondary battery can be further improved as a result of the specific surface area of the conductive material being at least 700 $m^2/g$.

In the present disclosure, the "specific surface area" of the conductive material refers to a BET specific surface area according to nitrogen adsorption that can be measured in accordance with ASTM D3037-81.

The presently disclosed slurry for lithium ion secondary battery positive electrode-use preferably has a viscosity of from 1,500 mPa·s to 8,000 mPa·s. The reason for this is that dispersion stability of the slurry for lithium ion secondary battery positive electrode-use can be further improved, and high-voltage cycle characteristics and output characteristics of the lithium ion secondary battery can also be further improved as a result of the viscosity of the slurry for lithium ion secondary battery positive electrode-use being in the aforementioned range.

In the present disclosure, the "viscosity" of the slurry for lithium ion secondary battery positive electrode-use refers to viscosity measured by a B-type viscometer, in accordance with JIS K7117-1, under conditions of a temperature of 25° C., an M4 rotor, and a rotation speed of 60 rpm.

Furthermore, the presently disclosed slurry for lithium ion secondary battery positive electrode-use preferably has a solid content concentration of from 75 mass % to 82 mass %. The reason for this is that dispersion stability of the slurry for lithium ion secondary battery positive electrode-use can be further improved, and high-voltage cycle characteristics and output characteristics of the lithium ion secondary battery can also be further improved as a result of the solid content concentration of the slurry for lithium ion secondary battery positive electrode-use being in the aforementioned range.

In the presently disclosed slurry for lithium ion secondary battery positive electrode-use, the conductive material is preferably Ketjenblack. The reason for this is that output characteristics of the lithium ion secondary battery can be further improved as a result of the conductive material being Ketjenblack.

A presently disclosed method for producing a slurry for lithium ion secondary battery positive electrode-use, which is a method for producing any one of the previously described slurries for lithium ion secondary battery positive electrode-use, comprises: a first step of mixing the conductive material, the polymer (P1), and the organic solvent to obtain a first conductive material paste; a second step of adding the fluorine-containing polymer (P2) to the first conductive material paste to obtain a second conductive material paste; and a third step of mixing the second conductive material paste and the positive electrode active material. When the presently disclosed slurry for lithium ion secondary battery positive electrode-use is produced through the steps described above, it is possible to further improve dispersion stability of the slurry for positive electrode-use, and also to further improve high-voltage cycle characteristics and output characteristics of a lithium ion secondary battery that includes a positive electrode formed using the slurry for positive electrode-use.

A presently disclosed method for producing a positive electrode for lithium ion secondary battery-use comprises: applying any one of the previously described slurries for lithium ion secondary battery positive electrode-use onto at least one side of a current collector; and drying the slurry for lithium ion secondary battery positive electrode-use that has been applied onto the at least one side of the current collector to form a positive electrode mixed material layer on the current collector. When a positive electrode is formed using the previously described slurry for lithium ion secondary battery positive electrode-use, a lithium ion secondary battery that includes the positive electrode can be provided with excellent high-voltage cycle characteristics and output characteristics.

Furthermore, a presently disclosed lithium ion secondary battery comprises a positive electrode, a negative electrode, a separator, and an electrolysis solution, wherein the positive electrode is a positive electrode for lithium ion secondary battery-use that is producible through the previously described method for producing a positive electrode for lithium ion secondary battery-use. A lithium ion secondary battery that includes a positive electrode produced by the previously described method for producing a positive electrode for lithium ion secondary battery-use has excellent high-voltage cycle characteristics and output characteristics, and high performance.

Advantageous Effect

According to the present disclosure, it is possible to provide a slurry for lithium ion secondary battery positive electrode-use that has excellent dispersion stability and that can be used to form a positive electrode that enables a lithium ion secondary battery to exhibit excellent high-voltage cycle characteristics and output characteristics.

Moreover, according to the present disclosure, it is possible to provide a method for producing a slurry for lithium ion secondary battery positive electrode-use that has excellent dispersion stability and that can be used to form a positive electrode that enables a lithium ion secondary battery to exhibit excellent high-voltage cycle characteristics and output characteristics.

Furthermore, according to the present disclosure, it is possible to provide a method for producing a positive electrode for lithium ion secondary battery-use that enables a lithium ion secondary battery to exhibit excellent high-voltage cycle characteristics and output characteristics, and to provide a lithium ion secondary battery including a positive electrode produced by this production method.

DETAILED DESCRIPTION

The following describes embodiments of the present disclosure in detail.

Herein, a presently disclosed slurry for lithium ion secondary battery positive electrode-use is used to form a positive electrode of a lithium ion secondary battery. Moreover, a presently disclosed method for producing a slurry for lithium ion secondary battery positive electrode-use is a method for producing the presently disclosed slurry for lithium ion secondary battery positive electrode-use. Furthermore, a presently disclosed method for producing a positive electrode for lithium ion secondary battery-use makes use of the presently disclosed slurry for lithium ion secondary battery positive electrode-use. Also, a presently disclosed lithium ion secondary battery includes a positive electrode for lithium ion secondary battery-use that is produced by the presently disclosed method for producing a positive electrode for lithium ion secondary battery-use.

(Slurry for Lithium Ion Secondary Battery Positive Electrode-Use)

The presently disclosed slurry for lithium ion secondary battery positive electrode-use is a composition in which an organic solvent serves as a dispersion medium and that contains a positive electrode active material, a binding material, and a conductive material in the organic solvent. The positive electrode active material is a lithium cobalt-based composite oxide particle having an oxide of at least one metal selected from the group consisting of Mg, Ca, Al, B, Ti, and Zr on the surface. The binding material includes at least the polymers described in (1) and (2) below.

(1) A polymer (P1) including a nitrile group-containing monomer unit, a (meth)acrylic acid ester monomer unit, and an alkylene structural unit having a carbon number of at least 4, and not substantially including a hydrophilic group-containing monomer unit (2) A fluorine-containing polymer (P2)

In the present disclosure, "including an alkylene structural unit having a carbon number of at least 4" means that "a repeating unit formed by only an alkylene structure represented by a general formula $-C_2H_{2n}-$ (where n is an integer of 4 or greater) is included in a polymer".

Moreover, in the present disclosure, "including a monomer unit" means that "a repeating unit derived from that monomer is included in a polymer obtained using that monomer".

Furthermore, in the present disclosure, "not substantially including a monomer unit" means that "the percentage content of that monomer unit in a polymer is 0% by mass or greater, but less than 0.05 mass %".

In addition, in the present disclosure, "(meth)acryl" is used to indicate "acryl" and/or "methacryl".

The slurry for positive electrode-use described above has excellent dispersion stability, and a positive electrode that is obtained using the slurry for positive electrode-use enables a lithium ion secondary battery to exhibit excellent high-voltage cycle characteristics and output characteristics. Specifically, as a result of the presently disclosed slurry for positive electrode-use containing the lithium cobalt-based composite oxide particle that has the oxide of the specific metal on its surface in combination with the binding material that includes the aforementioned polymer (P1), it is possible to enable a lithium ion secondary battery to exhibit excellent high-voltage cycle characteristics. Moreover, as a result of the presently disclosed slurry for positive electrode-use including the binding material that includes both the aforementioned polymer (P1) and the aforementioned fluorine-containing polymer (P2), it is possible to the provide the presently disclosed slurry for positive electrode-use with excellent dispersion stability and enable a lithium ion secondary battery to exhibit excellent output characteristics.

The following describes each of the components contained in the slurry for lithium ion secondary battery positive electrode-use described above.

<Positive Electrode Active Material>

A lithium cobalt-based composite oxide particle having an oxide of at least one metal selected from the group consisting of Mg, Ca, Al, B, Ti, and Zr on its surface is used as the positive electrode active material. High-voltage cycle characteristics of a lithium ion secondary battery can be improved as a result of an oxide of at least one metal selected from the group consisting of Mg, Ca, Al, B, Ti, and Zr being present on at least part of the particle surface of the lithium cobalt-based composite oxide particle that is used. Although it has not yet been clarified, the reason that improvement in high-voltage cycle characteristics can be achieved is presumed to be that the oxide of the specific metal that is present on the surface of the lithium cobalt-based composite oxide particle contributes to suppressing electrolysis solution decomposition at the surface of the positive electrode active material.

Herein, the lithium cobalt-based composite oxide particle is not specifically limited and examples thereof include lithium cobalt-based composite oxide particles described in JP 2014-2984 A and JP 2011-159421 A. Of these lithium cobalt-based composite oxide particles, a $LiCoO_2$ particle is preferable.

Furthermore, from a viewpoint of improving high-voltage cycle characteristics of a lithium ion secondary battery, the oxide of the metal (hereinafter, also referred to simply as a "surface metal oxide") that is present on the surface of a lithium cobalt-based composite oxide particle (hereinafter, also referred to simply as a "composite oxide particle") is preferably an oxide of at least one metal selected from the group consisting of Mg, Al, Ti, and Zr, more preferably an oxide of at least one metal selected from the group consisting of Mg, Al, and Zr, and particularly preferably an oxide of Mg.

Electrical characteristics of a lithium ion secondary battery are influenced by how much of the surface metal oxide is present on the surfaces of composite oxide particles such as described above. Accordingly, it is preferable that the positive electrode active material used in the present disclosure is a positive electrode active material for which a "coverage ratio of the lithium cobalt-based composite oxide particles" calculated using formula (I) shown below is within a specific range. As is clear from formula (I) shown below, the "coverage ratio of the lithium cobalt-based composite oxide particles" is an index that is correlated to how much of the surface metal oxide is present on the surfaces of the composite oxide particles.

Coverage ratio of lithium cobalt-based composite oxide particles={Atomic concentration of constituent metal element of surface metal oxide at outermost surface of positive electrode active material(atomic %)/Atomic concentration of all constituent elements of surface metal oxide and composite oxide particles at outermost surface of positive electrode active material (atomic %)}×100%   (I)

The coverage ratio of the lithium cobalt-based composite oxide particles is preferably at least 1%, and is preferably no greater than 10%, more preferably no greater than 5%, and particularly preferably no greater than 3%. High-voltage cycle characteristics of a lithium ion secondary battery can be improved as a result of the coverage ratio being at least 1%, whereas output characteristics of a lithium ion secondary battery can be ensured as a result of the coverage ratio being no greater than 10%.

The coverage ratio of the lithium cobalt-based composite oxide particles is calculated by the following method.

First, constituent elements of the surface metal oxide and the composite oxide particles are set as measurement target elements and the atomic concentration (atomic %) of each of the measurement target elements at the outermost surface of the positive electrode active material is calculated by X-ray photoelectron spectroscopy (ESCA).

Specifically, a fully automated scanning X-ray photoelectron spectrometer is, for example, used to calculate the atomic concentration of each element from a photoelectron intensity (peak area) and a relative sensitivity coefficient for the element based on the formula shown below. Note that in the following formula, C represents the atomic concentration (atomic %), I represents the photoelectron intensity (peak area), S represents the relative sensitivity coefficient, and the subscript i and j represent element types.

$$C = \frac{\left(\frac{I_i}{S_i}\right)}{\sum_{j=1}^{N}\left(\frac{I_j}{S_j}\right)} \times 100$$

The atomic concentrations that are measured for the elements are used to calculate the coverage ratio using the previously shown formula (I).

Herein, the method by which the surface metal oxide is caused to be supported on the surfaces of the lithium cobalt-based composite oxide particles and the method by which the coverage ratio is adjusted may be known methods such as those described in JP 2001-143703 A and JP 2003-7299 A.

The blending amount and particle diameter of the positive electrode active material may be, but are not specifically limited to, the same as those of conventionally-used positive electrode active materials.

(Binding Material)

The binding material is a component that in a positive electrode produced by forming a positive electrode mixed material layer on a current collector using the presently disclosed slurry for positive electrode-use, holds components contained in the positive electrode mixed material layer such that these components do not become detached from the positive electrode mixed material layer. In general, when a binding material in a positive electrode mixed material layer is immersed in an electrolysis solution, the binding material swells due to absorption of the electrolysis solution while binding the positive electrode active material together, binding the positive electrode mixed material to the conductive material, or binding the conductive material together such as to prevent the positive electrode active material and the like from becoming detached from the current collector.

In the present disclosure, it is required that at least two types of materials—the polymer (P1) and the fluorine-containing polymer (P2)—are used in combination as the binding material from a viewpoint of improving dispersion stability of the slurry for positive electrode-use and also from a viewpoint of enabling a lithium ion secondary battery to exhibit excellent high-voltage cycle characteristics and output characteristics.

It is presumed that dispersion stability of the slurry for positive electrode-use is improved as a result of the polymer (P1) being adsorbed onto the conductive material, and thereby suppressing aggregation of the conductive material in the slurry for positive electrode-use. Moreover, it is presumed that electrical characteristics (in particular, high-voltage cycle characteristics) of a lithium ion secondary battery are improved as a result of the polymer (P1) protecting the surface of the aforementioned positive electrode active material in a positive electrode formed using the slurry for positive electrode-use, and thereby suppressing electrolysis solution decomposition even in a situation in which cracks are formed in the surface metal oxide of the positive electrode active material due to expansion and contraction that occurs in accompaniment to charging and discharging. Furthermore, it is presumed that the fluorine-containing polymer (P2) used in combination with the polymer (P1) contributes to ensuring output characteristics of a lithium ion secondary battery.

<Polymer (P1)>

The polymer (P1) includes a nitrile group-containing monomer unit, a (meth)acrylic acid ester monomer unit, and an alkylene structural unit having a carbon number of at least 4, and does not substantially include a hydrophilic group-containing monomer unit.

[Nitrile Group-Containing Monomer Unit]

Examples of nitrile-group containing monomers that can be used to form the nitrile group-containing monomer unit include α,β-ethylenically unsaturated nitrile monomers. The α,β-ethylenically unsaturated nitrile monomer is not specifically limited other than being an α,β-ethylenically unsaturated compound that has a nitrile group and may for example be acrylonitrile; an α-halogenoacrylonitrile such as α-chloroacrylonitrile or α-bromoacrylonitrile; or an α-alkylacrylonitrile such as methacrylonitrile or α-ethylacrylonitrile. Of these monomers, from a viewpoint of increasing binding strength of the polymer (P1) and mechanical strength of a positive electrode, and of improving high-voltage cycle characteristics of a lithium ion secondary battery, the nitrile-group containing monomer is preferably acrylonitrile or methacrylonitrile, and is more preferably acrylonitrile.

Any one of such nitrile group-containing monomers may be used individually, or any two or more of such nitrile group-containing monomers may be used in combination.

The percentage content of the nitrile group-containing monomer unit in the polymer (P1) is preferably at least 2 mass %, and more preferably at least 10 mass %, and is preferably no greater than 50 mass %, more preferably no greater than 30 mass %, and particularly preferably no greater than 25 mass %, where the percentage content of all repeating units (total of monomer units and structural units) in the polymer (P1) is taken to be 100 mass %. As a result of the percentage content of the nitrile group-containing monomer unit in the polymer (P1) being within the aforementioned range, aggregation of the conductive material in the presently disclosed slurry for positive electrode-use is suppressed and the slurry is provided with good dispersion stability. Additionally, high-voltage cycle characteristics and output characteristics of a lithium ion secondary battery can be improved.

However, if the percentage content of the nitrile group-containing monomer unit in the polymer (P1) exceeds 50 mass %, the polymer (P1) tends to dissolve more readily in an electrolysis solution, and there is a concern that affinity of the polymer (P1) with respect to the positive electrode active material may increase excessively such that the polymer (P1) becomes a resistance component, which may lead to a lithium ion secondary battery including the positive electrode mixed material layer having poorer output characteristics. On the other hand, if the percentage content of the nitrile group-containing monomer unit in the polymer (P1) falls below 2 mass %, solubility of the polymer (P1) decreases, particularly with respect to an organic solvent such as N-methylpyrrolidone (NMP), and there is a concern that dispersibility of the conductive material in the obtained slurry for positive electrode-use may decrease and that dispersion stability of the slurry for positive electrode-use may decrease. Consequently, a lithium ion secondary battery produced using this slurry for secondary battery positive electrode-use may have poorer high-voltage cycle characteristics and output characteristics.

[(Meth)Acrylic Acid Ester Monomer Unit]

Examples of (meth)acrylic acid ester monomers that can be used to form the (meth)acrylic acid ester monomer unit include alkyl acrylates such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl methacrylates such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, and glycidyl methacrylate. Of these monomers, an alkyl acrylate in which the alkyl group bonded to the non-carbonyl oxygen atom has a carbon number of 4-10 is preferable as the (meth)acrylic acid ester monomer from a viewpoint of ensuring dispersion stability of the slurry for positive electrode-use. Specifically, of such alkyl acrylates, n-butyl acrylate and 2-ethylhexyl acrylate are preferable, and n-butyl acrylate is more preferable.

Any one of such (meth)acrylic acid ester monomers may be used individually, or any two or more of such (meth) acrylic acid ester monomers may be used in combination.

The percentage content of the (meth)acrylic acid ester monomer unit in the polymer (P1) is at least 10 mass %, preferably at least 20 mass %, and more preferably at least 30 mass %, and is preferably no greater than 40 mass %, where the percentage content of all repeating units in the polymer (P1) is taken to be 100 mass %. As a result of the percentage content of the (meth)acrylic acid ester monomer unit in the polymer (P1) being no greater than 40 mass %, solubility of the polymer (P1) can be improved, particularly with respect to an organic solvent such as NMP, and dispersion stability of the slurry for positive electrode-use can be further improved. Moreover, as a result of the percentage content of the (meth)acrylic acid ester monomer unit in the polymer (P1) being at least 10 mass %, the stability of a positive electrode mixed material layer formed using the slurry for positive electrode-use can be improved with respect to an electrolysis solution, and high-voltage cycle characteristics of a lithium ion secondary battery produced using the obtained slurry for positive electrode-use can be improved.

If the percentage content of the (meth)acrylic acid ester monomer unit in the polymer (P1) falls below 10 mass %, the strength of a positive electrode mixed material layer formed using the slurry for positive electrode-use decreases, the degree of swelling of the positive electrode mixed material layer with respect to an electrolysis solution increases, and the peel strength of the positive electrode mixed material layer decreases. Consequently, there is a concern that high-voltage cycle characteristics of a lithium ion secondary battery including such a positive electrode may deteriorate. On the other hand, if the percentage content of the (meth)acrylic acid ester monomer unit in the polymer (P1) exceeds 40 mass %, solubility of the polymer (P1) decreases, particularly with respect to an organic solvent such as NMP, and there is a concern that as a result, the conductive material may become unevenly dispersed in the slurry for positive electrode-use, leading to loss of dispersion stability of the slurry for positive electrode-use. Unfortunately, this may result in a situation in which a positive electrode formed using the slurry for positive electrode-use has poorer homogeneity, and in which a secondary battery including this positive electrode has poorer high-voltage cycle characteristics and output characteristics.

[Alkylene Structural Unit Having Carbon Number of at Least 4]

The alkylene structural unit having a carbon number of at least 4 may be in a straight chain form or a branched form. However, from a viewpoint of improving dispersion stability of the slurry for positive electrode-use, and also improving high-voltage cycle characteristics and output characteristics of a lithium ion secondary battery, the alkylene structural unit having a carbon number of at least 4 is preferably in a straight chain form; in other words, the alkylene structural unit having a carbon number of at least 4 is preferably a straight chain alkylene structural unit.

Although no specific limitations are placed on the method by which the alkylene structural unit having a carbon number of at least 4 is introduced into the polymer (P1), the methods described below in (1) and (2) may for example be used.

(1) A method involving preparing a polymer from a monomer composition containing a conjugated diene monomer and hydrogenating the resultant polymer in order to convert the conjugated diene monomer unit to an alkylene structural unit (2) A method involving preparing a polymer from a monomer composition containing a 1-olefin monomer having a carbon number of at least 4

Of these methods, the method described in (1) is preferable in terms of ease of production of the polymer (P1).

Herein, examples of the conjugated diene monomer include conjugated diene compounds having a carbon number of at least 4 such as 1,3-butadiene, isoprene, 2,3-dimethyl-1,3-butadiene, and 1,3-pentadiene. Of these conjugated diene compounds, 1,3-butadiene is preferable. In other words, the alkylene structural unit having a carbon number of at least 4 is preferably a structural unit obtained through hydrogenation of a conjugated diene monomer unit (i.e., the alkylene structural unit is preferably a hydrogenated conjugated diene unit), and is more preferably a structural unit obtained through hydrogenation of a 1,3-butadiene monomer unit (i.e., the alkylene structural unit is more preferably a hydrogenated 1,3-butadiene unit).

Examples of the 1-olefin monomer having a carbon number of at least 4 include 1-butene and 1-hexene.

Note that the conjugated diene monomer or the 1-olefin monomer having a carbon number of at least 4 may be one type used individually, or may be two or more types used in combination.

The percentage content of the alkylene structural unit having a carbon number of at least 4 in the polymer (P1) is preferably at least 30 mass %, and more preferably at least 40 mass %, and is preferably no greater than 98 mass %, and more preferably no greater than 80 mass %, where the percentage content of all repeating units (total of monomer units and structural units) in the polymer (P1) is taken to be 100 mass %. As a result of the percentage content of the alkylene structural unit having a carbon number of at least 4 in the polymer (P1) being in the aforementioned range, dispersion stability of the slurry for positive electrode-use can be improved, and high-voltage cycle characteristics and output characteristics of a lithium ion secondary battery can also be improved.

If the percentage content of the alkylene structural unit having a carbon number of at least 4 in the polymer (P1) falls below 30 mass %, solubility of the polymer (P1) becomes excessively high, particularly with respect to an organic solvent such as NMP, and there is a concern that as a result, the conductive material may be excessively dispersed in the slurry for positive electrode-use and that a lithium ion secondary battery produced using the slurry for positive electrode-use may have poorer high-voltage cycle characteristics. On the other hand, if the percentage content of the alkylene structural unit having a carbon number of at least 4 in the polymer (P1) exceeds 98 mass %, solubility of the polymer (P1) becomes excessively low, particularly with respect to an organic solvent such as NMP, and there is concern that as a result, the conductive material may be dispersed unevenly in the slurry for positive electrode-use and that high-voltage cycle characteristics of a lithium ion secondary battery produced using the slurry for positive electrode-use may deteriorate.

[Hydrophilic Group-Containing Monomer Unit]

Examples of hydrophilic group-containing monomers that can be used to form a hydrophilic group-containing monomer unit, which is not substantially included in the polymer (P1), include monomers having a carboxylic acid group, monomers having a sulfonate group, monomers having a phosphate group, and monomers having a hydroxy group.

Examples of monomers having a carboxylic acid group include monocarboxylic acids, derivatives of monocarboxylic acids, dicarboxylic acids, acid anhydrides of dicarboxylic acids, and derivatives of dicarboxylic acids.

Examples of monocarboxylic acids include acrylic acid, methacrylic acid, and crotonic acid.

Examples of monocarboxylic acid derivatives include 2-ethylacrylic acid, isocrotonic acid, α-acetoxy acrylic acid, β-trans-aryloxy acrylic acid, α-chloro-β-E-methoxy acrylic acid, and β-diamino acrylic acid.

Examples of dicarboxylic acids include maleic acid, fumaric acid, and itaconic acid.

Examples of derivatives of dicarboxylic acids include methyl maleic acid, dimethyl maleic acid, phenyl maleic acid, chloromaleic acid, dichloromaleic acid, fluoromaleic acid, and maleic acid esters such as methylallyl maleate, diphenyl maleate, nonyl maleate, decyl maleate, dodecyl maleate, octadecyl maleate, and fluoroalkyl maleate.

Examples of acid anhydrides of dicarboxylic acids include maleic anhydride, acrylic acid anhydride, methyl maleic anhydride, and dimethyl maleic anhydride.

Furthermore, an acid anhydride that produces a carboxyl group upon hydrolysis can also be used as a compound having a carboxylic acid group. Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of monomers having a sulfonate group include vinyl sulfonic acid, methyl vinyl sulfonic acid, (meth)allyl sulfonic acid, styrene sulfonic acid, (meth)acrylic acid-2-ethyl sulfonate, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of monomers having a phosphate group include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of monomers having a hydroxy group include ethylenically unsaturated alcohols such as (meth)allyl alcohol, 3-butene-1-ol, and 5-hexene-1-ol; alkanol esters of ethylenically unsaturated carboxylic acids such as 2-hydroxyethyl acrylate, 2-hydroxypropyl acrylate, 2-hydroxyethyl methacrylate, and 2-hydroxypropyl methacrylate; esters of (meth)acrylic acid and polyalkylene glycols represented by the general formula $CH_2=CR^1-COO-(C_nH_{2n}-O)_m-H$ (where m represents an integer of 2-9, n represents an integer of 2-4, and 10 represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether and (meth)allyl-2-hydroxypropyl ether; mono(meth)allyl ethers of polyoxyalkylene glycols such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether and (meth) allyl-2-chloro-3-hydroxypropyl ether; mono(meth)allyl ethers of polyhydric phenols such as eugenol and isoeugenol, and halogen substituted products thereof; and (meth) allyl thioethers of alkylene glycols such as (meth)allyl-2-hydroxyethyl thioether and (meth)allyl-2-hydroxypropyl thioether.

Note that in the present disclosure, the previously described nitrile group-containing monomer unit and (meth) acrylic acid ester monomer unit are monomer units that do not include a carboxylic acid group, a sulfonate group, a phosphate group, or a hydroxy group.

Herein, if a hydrophilic group-containing monomer unit is included in the polymer (P1), this leads to loss of dispersing ability of the polymer (P1) with respect to the conductive material and, particularly in a situation in which the conductive material has a larger specific surface area (for example, 700 $m^2$/g or greater), leads to loss of dispersion stability of the slurry for positive electrode-use. Furthermore, there is a concern that high-voltage cycle characteristics and output characteristics of a lithium ion secondary battery may be poorer as a result. Accordingly, from a viewpoint of ensuring dispersion stability of the slurry for positive electrode-use, and also of ensuring high-voltage cycle characteristics and output characteristics of a lithium ion secondary battery, the percentage content of the hydrophilic group-containing monomer unit in the polymer (P1) is required to be less than 0.05 mass % (i.e., not substantially included), and is preferably 0 mass %, where the percentage content of all repeating units in the polymer (P1) is taken to be 100 mass %.

[Other Monomer Units]

The polymer (P1) may include monomer units other than those described above so long as the effects of the present disclosure are not lost. For example, the polymer (P1) may include a fluorine-containing monomer unit. In a situation in which the polymer (P1) includes a fluorine-containing monomer unit, the percentage content of the fluorine-containing monomer unit in the polymer (P1) is preferably less than 70 mass %, where the percentage content of all repeating units in the polymer (P1) is taken to be 100 mass %.

[Method for Producing Polymer (P1)]

Although no specific limitations are placed on the method by which the polymer (P1) is produced, the polymer (P1) can for example be produced by polymerizing a monomer composition containing the previously described monomers to obtain a polymer, and by optionally hydrogenating the resultant polymer.

In the present disclosure, the percentage content of each of the monomers in the monomer composition can be set in accordance with the percentage content of each of the monomer units and structural units (repeating units) in the polymer (P1).

Although the polymerization method is not specifically limited, a method such as solution polymerization, suspension polymerization, bulk polymerization, or emulsion polymerization may be used. A known emulsifier or polymerization initiator may be used in these polymerization methods as necessary.

Although the method by which hydrogenation is performed is not specifically limited, the hydrogenation may be carried by a standard method using a catalyst (for example, refer to WO 2012/165120 A1, WO 2013/080989 A1, and JP 2013-8485 A).

An iodine value of the hydrogenated polymer is preferably no greater than 60 mg/100 mg, more preferably no greater than 30 mg/100 mg, and particularly preferably no greater than 20 mg/100 mg. A lower limit of at least 3 mg/100 mg is preferable, and a lower limit of at least 8 mg/100 mg is more preferable. The iodine value can be measured by a method described in the "EXAMPLES" section of the present specification.

The polymer (P1) is used as either a dispersion liquid or a solution in which the polymer (P1) is dispersed or dissolved in a dispersion medium. No specific limitations are placed on the dispersion medium for the polymer (P1) other than being a dispersion medium that enables the polymer (P1) to be homogeneously dispersed or dissolved. The dispersion medium can for example be water or an organic solvent, and is preferably an organic solvent. The organic solvent is not specifically limited and may for example be the organic solvent that is used in the presently disclosed slurry for positive electrode-use.

<Fluorine-Containing Polymer (P2)>

The fluorine-containing polymer (P2) is a polymer that is different from the previously described polymer (P1) and that includes a fluorine-containing monomer unit. Specific examples of the fluorine-containing polymer (P2) include homopolymers and copolymers of one or more fluorine-containing monomers, and copolymers of one or more fluorine-containing monomers with a monomer that does not contain fluorine (hereinafter, referred to as a "non-fluorine-containing monomer").

The percentage content of the fluorine-containing monomer unit in the fluorine-containing polymer (P2) is normally at least 70 mass %, and preferably at least 80 mass %. The percentage content of the non-fluorine-containing monomer unit in the fluorine-containing polymer (P2) is normally no greater than 30 mass %, and preferably no greater than 20 mass %.

Examples of fluorine-containing monomers that can be used to form the fluorine-containing monomer unit include vinylidene fluoride, tetrafluoroethylene, hexafluoropropylene, trifluorovinyl chloride, vinyl fluoride, and perfluoroalkyl vinyl ethers. Of these monomers, vinylidene fluoride is preferable as the fluorine-containing monomer.

Examples of non-fluorine-containing monomers that can be used to form the non-fluorine-containing monomer unit include known monomers that do not contain fluorine and that are copolymerizable with the fluorine-containing monomer.

The fluorine-containing polymer (P2) is preferably a homopolymer of vinylidene fluoride (i.e., polyvinylidene fluoride), polytetrafluoroethylene, or a copolymer of vinylidene fluoride and hexafluoropropylene, and is more preferably polyvinylidene fluoride.

The fluorine-containing polymer (P2) described above may be one type of polymer that is used individually, or two or more types of polymers that are used in combination.

[Method for Producing Fluorine-Containing Polymer (P2)]

The fluorine-containing polymer (P2) can for example be produced by polymerizing a monomer composition containing the monomers described above in an aqueous solvent. In the present disclosure, the percentage content of each of the monomers in the monomer composition can be set in accordance with the percentage content of each of the monomer units (repeating units) in the fluorine-containing polymer (P2).

Although the polymerization method is not specifically limited, a method such as solution polymerization, suspension polymerization, bulk polymerization, or emulsion polymerization may be used. A known emulsifier or polymerization initiator may be used in these polymerization methods as necessary.

The fluorine-containing polymer (P2) is used as either a dispersion liquid or a solution in which the fluorine-containing polymer (P2) is dispersed or dissolved in a dispersion medium. No specific limitations are placed on the dispersion medium for the fluorine-containing polymer (P2) other than being a dispersion medium that enables the fluorine-containing polymer (P2) to be homogeneously dispersed or dissolved. The dispersion medium can for example be water or an organic solvent, and is preferably an organic solvent. The organic solvent is not specifically limited and may for example be the organic solvent used in the presently disclosed slurry for positive electrode-use.

[Blending Amounts of Polymer (P1) and Fluorine-Containing Polymer (P2) in Slurry for Positive Electrode-Use]

Herein, no specific limitations are placed on the ratio of blending amounts of the polymer (P1) and the fluorine-containing polymer (P2) in the presently disclosed slurry for positive electrode-use. The blending amount of the polymer (P1), expressed as a percentage of the total of the blending amount of the polymer (P1) and the blending amount of the fluorine-containing polymer (P2), is preferably at least 5 mass %, and is preferably no greater than 50 mass %, more preferably no greater than 35 mass %, and particularly preferably no greater than 25 mass %. As a result of P1 composing at least 5 mass % of P1+P2, aggregation of the conductive material can be suppressed, and output characteristics and high-voltage cycle characteristics of a lithium ion secondary battery can be improved. On the other hand, as a result of P1 composing no greater than 50 mass % of P1+P2, output characteristics of a lithium ion secondary battery can be improved.

The blending amount of the binding material (polymer (P1) and fluorine-containing polymer (P2)) in the presently disclosed slurry for positive electrode-use, in terms of solid content per 100 parts by mass of the positive electrode active material, is preferably at least 0.1 parts by mass, and more preferably at least 0.5 parts by mass, and is preferably no greater than 10 parts by mass, and more preferably no greater than 5 parts by mass. As a result of the blending amount of the binding material being at least 0.1 parts by mass per 100 parts by mass of the positive electrode active material, binding capacity with respect to the positive electrode active material, between the positive electrode active material and the conductive material, and between the positive electrode active material and the current collector can be increased, and as a consequence, when a lithium ion secondary battery is produced, good output characteristics can be obtained and battery life can be extended. Furthermore, as a result of the blending amount being no greater than 10 parts by mass, diffusivity of an electrolysis solution can be ensured and good output characteristics can be obtained for a lithium ion secondary battery that includes a positive electrode obtained using the slurry for positive electrode-use that contains the binding material.

The percentage of the binding material that is composed by the polymer (P1) and the fluorine-containing polymer (P2) is preferably at least 80 mass %, more preferably at least 95 mass %, and particularly preferably 100 mass %. In other words, the binding material is preferably composed of only the polymer (P1) and the fluorine-containing polymer (P2).

<Conductive Material>

The conductive material ensures electrical contact within the positive electrode active material in a positive electrode mixed material layer. The conductive material used in the presently disclosed slurry for positive electrode-use is not specifically limited and may for example be a known conductive material. Specific examples of the conductive material include conductive carbon materials such as acetylene black, Ketjenblack® (Ketjenblack is a registered trademark in Japan, other countries, or both), furnace black, graphite, carbon fiber, carbon flakes, and carbon nanofibers (for example, carbon nanotubes or vapor-grown carbon fiber); and fibers and foils of various metals. Of these materials, the conductive material is preferably Ketjenblack from a viewpoint of sufficiently improving output characteristics of a lithium ion secondary battery.

The specific surface area of the conductive material is preferably at least 700 $m^2/g$, more preferably at least 750 $m^2/g$, and particularly preferably at least 1,000 $m^2/g$, and is preferably no greater than 2,500 $m^2/g$. Output characteristics of a lithium ion secondary battery can be further improved as a result of the specific surface area of the conductive material being at least 700 $m^2/g$. On the other hand, aggregation of the conductive material can be suppressed, and thus a decrease in dispersion stability of the slurry for positive electrode-use and output characteristics can be suppressed, as a result of the specific surface area being no greater than 2,500 $m^2/g$.

The blending amount of the conductive material per 100 parts by mass of the positive electrode active material in the presently disclosed slurry for positive electrode-use is preferably at least 0.5 parts by mass, and more preferably at least 1 part by mass, and is preferably no greater than 4 parts by mass, and more preferably no greater than 3 parts by mass. If the blending amount of the conductive material is excessively small, sufficient electrical contact within the positive electrode active material cannot be ensured, and consequently it may not be possible to sufficiently improve output characteristics of a lithium ion secondary battery. On the other hand, if the blending amount of the conductive material is excessively large, there is a concern that dispersion stability of the slurry for positive electrode-use may decrease, and that as result of a decrease in density of a positive electrode mixed material layer in a positive electrode for lithium ion secondary battery-use, it may not be possible to provide a lithium ion secondary battery with sufficiently high capacity.

<Organic Solvent>

The organic solvent used in the presently disclosed slurry for positive electrode-use may for example be a polar organic solvent in which the previously described polymer (P1) and fluorine-containing polymer (P2) can dissolve.

Specific examples of the organic solvent include N-methylpyrrolidone, acetone, dimethylformamide, and tetrahydrofuran. Of these solvents, the organic solvent is most preferably N-methylpyrrolidone from a viewpoint of ease of handling, safety, and ease of synthesis.

Note that any one of such organic solvents may be used individually, or any two or more of such organic solvents may be used in combination.

<Other Components>

Components other than those described above may be mixed into the presently disclosed slurry for positive electrode-use. Examples of other components that can be used include a viscosity modifier, a reinforcing material, an antioxidant, and an electrolysis solution additive having a function of suppressing electrolysis solution decomposition. These other components may be commonly known components.

<Properties of Slurry for Lithium Ion Secondary Battery Positive Electrode-Use>

The viscosity of the slurry for positive electrode-use as measured by a B-type viscometer, in accordance with JIS K7117-1, under conditions of a temperature of 25° C., an M4 rotor, and a rotational speed of 60 rpm is preferably at least 1,500 mPa·s, more preferably at least 2,000 mPa·s, and particularly preferably at least 3,000 mPa·s, and is preferably no greater than 8,000 mPa·s, more preferably no greater than 7,000 mPa·s, and particularly preferably no greater than 5,000 mPa·s. As a result of the viscosity of the slurry for positive electrode-use being at least 1,500 mPa·s, aggregation of the conductive material can be suppressed, and high-voltage cycle characteristics and output characteristics of a lithium ion secondary battery can be improved. On the other hand, as a result of the viscosity of the slurry for positive electrode-use being no greater than 8,000 mPa·s, sufficient fluidity of the slurry for positive electrode-use can be ensured such that the slurry for positive electrode-use can be uniformly applied onto a current collector, and high-voltage cycle characteristics and output characteristics of a lithium ion secondary battery can be improved.

The viscosity of the slurry for positive electrode-use can be adjusted through, for example, the amount of the organic solvent that is added during mixing, use of a viscosity modifier, the mixing method (for example, the stirring speed and mixing time of the mixing), the solid content concentration of the slurry for positive electrode-use, and the composition of the binding material.

The solid content concentration of the slurry for positive electrode-use is preferably at least 75 mass %, more preferably at least 76 mass %, and particularly preferably at least 77 mass %, and is preferably no greater than 82 mass %, more preferably no greater than 81 mass %, and particularly preferably no greater than 80 mass %. As a result of the solid content concentration of the slurry for positive electrode-use being in the aforementioned range, the slurry for positive electrode-use can be provided with high dispersion stability, and high-voltage cycle characteristics and output characteristics of a lithium ion secondary battery can be improved.

The slurry for positive electrode-use can be produced by dissolving and/or dispersing each of the components in the organic solvent. Although no specific limitations are placed on the mixing order of components or the mixing method in production of the slurry for positive electrode-use, the mixing order and the mixing method are preferably those described in the "Method for producing slurry for lithium ion secondary battery positive electrode-use" section of the present specification.

(Method for Producing Slurry for Lithium Ion Secondary Battery Positive Electrode-Use)

The presently disclosed method for producing a slurry for lithium ion secondary battery positive electrode-use, which is a method for producing the presently disclosed slurry for lithium ion secondary battery positive electrode-use described above, includes at least the steps described below in (1) to (3).

(1) A first step of mixing a conductive material, a polymer (P1), and an organic solvent to obtain a first conductive material paste (2) A second step of adding a fluorine-containing polymer (P2) to the first conductive material paste to obtain a second conductive material paste (3) A third step of mixing the second conductive material paste and a positive electrode active material It should be noted that the positive electrode active material, the polymer (P1), the fluorine-containing polymer (P2), the conductive material, and the organic solvent are the same as those described in the "Slurry for lithium ion secondary battery positive electrode-use" section of the present specification. The amounts of the components that are added in the aforementioned steps can be adjusted as appropriate in accordance with, for example, the target blending amounts of the components in the slurry for positive electrode-use, the target solid content concentration of the slurry for positive electrode-use, and the target viscosity of the slurry for positive electrode-use.

As a result of the presently disclosed slurry for positive electrode-use being produced through the first, second, and third steps described above, dispersion stability of the slurry for positive electrode-use can be improved, and high-voltage cycle characteristics and output characteristics of a lithium ion secondary battery can also be improved.

<First Step>

In the first step of the presently disclosed method for producing a slurry for lithium ion secondary battery positive electrode-use, the conductive material, the polymer (P1), and the organic solvent are mixed to obtain the first conductive material paste. Through pre-mixing of the polymer (P1) and the conductive material as described above, it is possible to ensure sufficient adsorption of the polymer (P1) onto the conductive material. As a result, aggregation of the conductive material in the slurry for positive electrode-use can be suppressed such that the slurry for positive electrode-use has higher dispersion stability.

Although no specific limitations are placed on the method by which the conductive material, the polymer (P1), and the organic solvent are mixed to obtain the first conductive material paste, the mixing may for example be performed using a standard mixer such as a disperser, a mill, a kneader, or a planetary mixer.

Furthermore, components other than the conductive material, the polymer (P1), and the organic solvent may also be blended in the first step. For example, components described as "other components" in the "Slurry for lithium ion secondary battery positive electrode-use" section of the present specification or a binding material component other than the polymer (P1) may also be blended in the first step. The binding material component other than the polymer (P1) is not specifically limited and may for example be a known polymer that is used as a binding material component or the fluorine-containing polymer (P2).

In a situation in which a binding material component other than the polymer (P1) is used in the first step, the other binding material component and the polymer (P1) may be pre-mixed before being mixed with the conductive material or may be mixed with the conductive material without pre-mixing. The organic solvent in which the polymer (P1) is dissolved may be used as the organic solvent in the first step or an organic solvent may be separately added as the organic solvent in the first step.

Among the polymer (P1) and the optional other binding material component (referred to collectively as a "first binding material") blended in the first step, the percentage composed by the polymer (P1) is preferably at least 50 mass %, more preferably at least 70 mass %, and particularly preferably at least 80 mass %, where the amount of the first binding material is taken to be 100 mass %. The percentage of the first binding material composed by the polymer (P1) is most preferably 100 mass %. As a result of the percentage of the first binding material that is composed by the polymer (P1) being at least 50 mass % and the polymer (P1) being added in the first binding material in this ratio, the polymer (P1) is sufficiently adsorbed onto the conductive material and dispersion stability of the resultant slurry for positive electrode-use is improved. Moreover, high-voltage cycle characteristics and output characteristics of a lithium ion secondary battery produced using the aforementioned slurry for positive electrode-use can be improved.

<Second Step>

In the second step of the presently disclosed method for producing a slurry for lithium ion secondary battery positive electrode-use, the fluorine-containing polymer (P2) is added to the first conductive material paste prepared in the first step to obtain a second conductive material paste.

Although no specific limitations are placed on the method by which the first conductive material paste and the fluorine-containing polymer (P2) are mixed to obtain the second conductive material paste, the mixing may for example be performed using a standard mixer such as those described for the first step.

Components other than the first conductive material paste and the fluorine-containing polymer (P2) may also be blended in the second step. For example, components described as "other components" in the "Slurry for lithium ion secondary battery positive electrode-use" section of the present specification, the organic solvent, or a binding material component other than the fluorine-containing polymer (P2) may also be blended in the second step.

The binding material component other than the fluorine-containing polymer (P2) is not specifically limited and may for example be a known polymer that is used as a binding material component or the polymer (P1). In a situation in which a binding material component other than the fluorine-containing polymer (P2) is used in the second step, the other binding material component and the fluorine-containing polymer (P2) may be pre-mixed before being mixed with the first conductive material paste, or may be mixed with the first conductive material paste without pre-mixing.

Among the fluorine-containing polymer (P2) and the optional other binding material component (referred to collectively as a "second binding material") blended in the second step, the percentage composed by the fluorine-containing polymer (P2) is preferably at least 50 mass %, and more preferably at least 80 mass %, where the amount of the second binding material is taken to be 100 mass %. The percentage of the second binding material composed by the fluorine-containing polymer (P2) is most preferably 100 mass %. As a result of the blending amount of the fluorine-containing polymer (P2) in the second binding material being in the aforementioned range and the fluorine-containing polymer (P2) being added in the second binding material in this ratio, dispersion stability of the resultant slurry for positive electrode-use can be improved without impeding adsorption of the polymer (P1) onto the conductive material. Moreover, high-voltage cycle characteristics and output characteristics of a lithium ion secondary battery produced using the aforementioned slurry for positive electrode-use can be further improved.

<Third Step>

In the third step of the presently disclosed method for producing a slurry for lithium ion secondary battery positive electrode-use, the second conductive material paste prepared in the second step and the positive electrode active material are mixed to obtain a slurry for positive electrode-use.

Although no specific limitations are placed on the method by which the second conductive material paste and the positive electrode active material are mixed to obtain the slurry for positive electrode-use, the mixing may for example be performed using a standard mixer such as those described for the first step.

Furthermore, components other than the second conductive material paste and the positive electrode active material may also be blended in the third step. For example, components described as "other components" in the "Slurry for lithium ion secondary battery positive electrode-use" section of the present specification or the organic solvent may also be blended in the third step.

As a result of the positive electrode active material being mixed in the third step of the presently disclosed method for producing a slurry for lithium ion secondary battery positive electrode-use, dispersibility of the positive electrode active material in the resultant slurry for positive electrode-use can be improved. Furthermore, as a result of the positive electrode active material being mixed in a state in which the polymer (P1) has been pre-adsorbed onto the conductive material, the conductive material becomes coordinated in proximity to the positive electrode active material in the third step, with the polymer (P1) in-between. Accordingly, through such coordination of the conductive material, output characteristics of an obtained lithium ion secondary battery are improved, and high-voltage cycle characteristics of the lithium ion secondary battery are also favorably improved as a result of the positive electrode active material being protected by the polymer (P1).

(Method for Producing Positive Electrode for Lithium Ion Secondary Battery-Use)

The presently disclosed method for producing a positive electrode for lithium ion secondary battery-use includes: applying the presently disclosed slurry for lithium ion secondary battery positive electrode-use onto at least one side of a current collector (application step); and drying the slurry for lithium ion secondary battery positive electrode-use that has been applied onto the at least one side of the current collector to form a positive electrode mixed material layer on the current collector (drying step).

A presently disclosed positive electrode for lithium ion secondary battery-use can also be produced by a method in which composite particles are prepared through dry granulation of the presently disclosed slurry composition for lithium ion secondary battery electrode-use and are used to form a positive electrode mixed material layer on a current collector.

As a result of the positive electrode mixed material layer in the positive electrode for lithium ion secondary battery-use that is produced as described above being formed using the presently disclosed slurry for lithium ion secondary battery positive electrode-use, a lithium ion secondary battery having excellent high-voltage cycle characteristics and output characteristics can be obtained using the positive electrode for lithium ion secondary battery-use.

[Application Step]

The method by which the slurry for lithium ion secondary battery positive electrode-use is applied onto the current collector is not specifically limited and may for example be a commonly known method. Specific examples of application methods that can be used include doctor blading, dip coating, reverse roll coating, direct roll coating, gravure coating, extrusion coating, and brush coating. In the application, the slurry for lithium ion secondary battery positive electrode-use may be applied onto just one side of the current collector or may be applied onto both sides of the current collector. The thickness of the slurry coating on the current collector after application but before drying may be appropriately set in accordance with the thickness of the positive electrode mixed material layer to be obtained after drying.

The current collector onto which the slurry for lithium ion secondary battery positive electrode-use is applied is made of a material having electrical conductivity and electrochemical durability. Specifically, the current collector may be made of aluminum or an aluminum alloy. Moreover, aluminum and an aluminum alloy may be used in combination, or different types of aluminum alloys may be used in combination. Aluminum and aluminum alloys are heat resistant and electrochemically stable, and hence serve as excellent current collector materials.

[Drying Step]

The method by which the slurry for lithium ion secondary battery positive electrode-use is dried is not specifically limited and may for example be a commonly known method. Examples of drying methods that can be used include drying by warm, hot, or low-humidity air; drying in a vacuum; and drying by irradiation of infrared light or electron beams. As a result of the slurry for lithium ion secondary battery positive electrode-use being dried on the current collector as described above, a positive electrode mixed material layer can be formed on the current collector, and a positive electrode for lithium ion secondary battery-use including the current collector and the positive electrode mixed material layer can be obtained.

After the drying step, the positive electrode mixed material layer may be further subjected to pressing treatment such as mold pressing or roll pressing. The pressing treatment can improve the close adherence between the positive electrode mixed material layer and the current collector.

(Lithium Ion Secondary Battery)

The presently disclosed lithium ion secondary battery includes a positive electrode, a negative electrode, a separator, and an electrolysis solution. The positive electrode is a positive electrode for lithium ion secondary battery-use that is produced by the presently disclosed method for producing a positive electrode for a lithium ion secondary battery-use. The presently disclosed lithium ion secondary battery has excellent high-voltage cycle characteristics and output characteristics, and also high performance, as a result of including the positive electrode that is produced by the presently disclosed method for producing a positive electrode for lithium ion secondary battery-use.

<Negative Electrode>

The negative electrode of the lithium ion secondary battery may be any known negative electrode that is used as a negative electrode of a lithium ion secondary battery. Specifically, the negative electrode may for example be a negative electrode formed by a thin sheet of lithium metal or a negative electrode obtained by forming a negative electrode mixed material layer on a current collector.

The current collector may be made of a metal material such as iron, copper, aluminum, nickel, stainless steel, titanium, tantalum, gold, or platinum. The negative electrode mixed material layer may be a layer that contains a negative electrode active material and a binding material. The binding material is not specifically limited and may be freely selected from known materials.

<Electrolysis Solution>

The electrolysis solution is normally an organic electrolysis solution in which a supporting electrolyte is dissolved in an organic solvent. The supporting electrolyte is for example a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable and $LiPF_6$ is particularly preferable as these lithium salts readily dissolve in a solvent and exhibit a high degree of dissociation. The electrolyte may be one type used individually, or may be two or more types combined in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution is not specifically limited so long as the supporting electrolyte can dissolve therein. Examples of organic solvents that can be used include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region, and a mixture of ethylene carbonate and ethyl methyl carbonate is more preferable.

The concentration of the electrolyte in the electrolysis solution can be adjusted as appropriate and is, for example, preferably from 0.5 mass % to 15 mass %, more preferably from 2 mass % to 13 mass %, and particularly preferably form 5 mass % to 10 mass %. Moreover, a known additive such as fluoroethylene carbonate or ethyl methyl sulfone may be added to the electrolysis solution.

<Separator>

The separator is not specifically limited and examples thereof include separators described in JP 2012-204303 A. Of these separators, a fine porous membrane made of polyolefinic (polyethylene, polypropylene, polybutene, or polyvinyl chloride) resin is preferred because the entire separator can be formed with a thin film-thickness, which increases the ratio of the electrode active material in the lithium ion secondary battery, and consequently increases the capacity per unit volume.

<Method for Producing Lithium Ion Secondary Battery>

The presently disclosed lithium ion secondary battery can be produced, for example, by stacking the positive electrode and the negative electrode with the separator in-between, rolling or folding the resulting stack as necessary in accordance with the battery shape, placing the stack in a battery container, filling the battery container with the electrolysis solution, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used to express quantities are by mass, unless otherwise specified.

In the examples and comparative examples, evaluation was performed by the following methods in order to evaluate the coverage ratio of lithium cobalt-based composite oxide particles, dispersion stability of a slurry for positive electrode-use, and high-voltage cycle characteristics and output characteristics of a lithium ion secondary battery.

<Coverage Ratio>

First, constituent elements of a surface metal oxide and composite oxide particles were set as measurement target elements and the atomic concentration (atomic %) of each of the measurement target elements at the outermost surface of the positive electrode active material was calculated by X-ray photoelectron spectroscopy (ESCA) from a peak in a photoelectron spectrum. Specifically, a fully automated scanning X-ray photoelectron spectrometer (AXIS-ULTRA DLD produced by Shimadzu Corporation) was used as a spectrometer to calculate the atomic concentration of each element based on the following formula, using a photoelectron intensity (peak area) measured for the element and a relative sensitivity coefficient for the element.

$$C = \frac{\left(\frac{I_i}{S_i}\right)}{\sum_{j=1}^{N}\left(\frac{I_j}{S_j}\right)} \times 100$$

(In the above formula, C represents the atomic concentration (atomic %), I represents the photoelectron intensity (peak area), S represents the relative sensitivity coefficient, and the subscript i and j represent element types.)

The coverage ratio was calculated using the previously shown formula (I).

<Dispersion Stability of Slurry for Positive Electrode-Use>

The viscosity η0 of a slurry for lithium ion secondary battery positive electrode-use was measured by a B-type viscometer (RB80L produced by Toki Sangyo Co., Ltd.), in accordance with JIS K7117-1, under conditions of a temperature of 25° C., an M4 rotor, and a rotation speed of 60 rpm. After measurement of the viscosity, the slurry for positive electrode-use was stirred for 24 hours using a planetary mixer (rotation speed: 60 rpm, ambient temperature: 25° C.). The viscosity η1 of the slurry for positive electrode-use after stirring was measured in the same way as the viscosity η0. Viscosity retention was calculated using the formula: viscosity retention (%)=(η1/η0)×100. The calculated viscosity retention was used to evaluate dispersion stability of the slurry for positive electrode-use in accordance with the following criteria. A large value indicates that the change in viscosity due to aggregation of components in the slurry for positive electrode-use is small, and hence that the slurry for positive electrode-use has excellent dispersion stability.

A: Viscosity retention of at least 80%
B: Viscosity retention of at least 70% and less than 80%
C: Viscosity retention of less than 70%

<High-Voltage Cycle Characteristics>

For each of 10 cells of a produced lithium ion secondary battery, 100 cycles were performed of a repeated operation in which, at a temperature of 25° C., charging was performed to a battery voltage of 4.4 V with a constant current at 1 C and discharging was performed to a battery voltage of 3 V with a constant current at 1 C. The discharge capacity of the 100th cycle (average value of 10 cells) was calculated as a percentage relative to the discharge capacity of the 1st cycle (average value of 10 cells) (Charge/discharge capacity retention (%)=(Discharge capacity of 100th cycle/Discharge capacity of 1st cycle)×100), and was evaluated according to the following criteria. A larger value indicates better high-voltage cycle characteristics.

A: Charge/discharge capacity retention of at least 80%
B: Charge/discharge capacity retention of at least 70% and less than 80%
C: Charge/discharge capacity retention of at least 60% and less than 70%
D: Charge/discharge capacity retention of less than 60%

<Output Characteristics>

For each of 10 cells of a produced lithium ion secondary battery, a charge/discharge cycle was carried out in which, at a temperature of 25° C., charging was performed to 4.4 V with a constant current at 0.2 C and discharging was performed to 3.0 V with a constant current at 0.2 C, and a charge/discharge cycle was carried out in which, at a temperature of 25° C., charging was performed to 4.4 V with a constant current at 0.2 C and discharging was performed to 3.0 V with a constant current at 1.0 C. The discharge capacity at 1.0 C (average value of 10 cells) was calculated as a percentage relative to the discharge capacity at 0.2 C (average value of 10 cells) (Output characteristics (%)= (Discharge capacity at 1.0 C/Discharge capacity at 0.2 C)×100), and was evaluated according to the following criteria. A larger value indicates smaller internal resistance and better output characteristics.

A: Output characteristics of at least 80%
B: Output characteristics of at least 75% and less than 80%
C: Output characteristics of at least 70% and less than 75%
D: Output characteristics of less than 70%

Example 1

<Production of Polymer (P1)>

An autoclave equipped with a stirrer was charged with, in the stated order, 240 parts of deionized water, 2.5 parts of sodium alkylbenzene sulfonate as an emulsifier, 35 parts of n-butyl acrylate (BA) as a (meth)acrylic acid ester monomer, and 20 parts of acrylonitrile (AN) as a nitrile group-containing monomer. After the inside of a bottle had been purged with nitrogen, 45 parts of 1,3-butadiene (BD) was added under pressure as a conjugated diene monomer, and 0.25 parts of ammonium persulfate was added as a polymerization initiator. A polymerization reaction was carried out at a reaction temperature of 40° C. to yield a polymer including a conjugated diene monomer unit, a (meth)acrylic acid ester monomer unit, and a nitrile group-containing monomer unit. The polymerization conversion rate was 85% and the iodine value was 280 mg/100 mg.

The iodine value was measured by the procedure described below. First, 100 g of an aqueous dispersion of the polymer was coagulated in 1 L of methanol. Thereafter, vacuum drying was performed for 12 hours at 60° C. to yield a dried polymer, the iodine value of which was measured in accordance with JIS K6235 (2006).

Deionized water was added to the obtained polymer to prepare a solution having a total solid content concentration of 12 mass %, and 400 mL (total solid content 48 g) of this solution was loaded into a 1 L autoclave equipped with a stirrer. Nitrogen gas was caused to flow for 10 minutes in order to remove oxygen dissolved in the solution. Thereafter, 75 mg of palladium acetate used as a hydrogenation reaction catalyst was dissolved in 180 mL of deionized water to which nitric acid had been added in an amount of four molar equivalents of the palladium (Pd), and the resultant solution was added into the autoclave. After purging the system twice with hydrogen gas, the contents of the autoclave were heated to 50° C. in a state in which the hydrogen gas pressure was raised to 3 MPa, and a hydrogenation reaction (first stage hydrogenation reaction) was carried out for 6 hours. At this point, the iodine value of the polymer was 35 mg/100 mg.

Next, the autoclave was returned to atmospheric pressure. In addition, 25 mg of palladium acetate used as a hydrogenation reaction catalyst was dissolved in 60 mL of deionized water to which nitric acid had been added in an amount of four molar equivalents of the Pd, and the resultant solution was added into the autoclave. After purging the system twice with hydrogen gas, the contents of the autoclave were heated to 50° C. in a state in which the hydrogen gas pressure was raised to 3 MPa, and a hydrogenation reaction (second stage hydrogenation reaction) was carried out for 6 hours. At this point, the iodine value of the polymer was 10 mg/100 mg and substantially all monomer units derived from BD were confirmed to had been hydrogenated.

Next, the contents of the autoclave were returned to room temperature and the system was changed to a nitrogen atmosphere. Thereafter, concentrating was performed using an evaporator until a solid content concentration of 40% was reached to thereby yield an aqueous dispersion of the polymer (P1). Subsequently, 320 parts of NMP was added to 100 parts of the aqueous dispersion of the polymer (P1) and water was evaporated under reduced pressure to yield an NMP solution of the polymer (P1).

<Production of Slurry for Positive Electrode-Use>

A first conductive material paste was obtained by using a disperser to mix (3,000 rpm, 10 minutes) 1 part of Ketjenblack (KB; ECP600JD produced by Lion Corporation; specific surface area 1,270 $m^2$/g) as a conductive material, 0.1 parts by solid content equivalents of the previously described NMP solution of the polymer (P1) (solid content concentration 8.0 mass %; composing 10% of the total of P1+P2), and an appropriate amount of NMP such that the solid content concentration of the first conductive material paste was 10 mass %.

Thereafter, a second conductive material paste was obtained by using the disperser to mix (3,000 rpm, 10 minutes) 0.9 parts by solid content equivalents of polyvinylidene fluoride (PVdF; KF Polymer #7200 produced by Kureha Corporation) as the fluorine-containing polymer (P2) and an appropriate amount of NMP such that the solid content concentration of the second conductive material paste was 10 mass %.

Next, 100 parts of $LiCoO_2$ particles having an oxide of Mg on the surfaces thereof (coverage ratio 1%, average particle diameter (D50) 16 μm) as a positive electrode active material and an appropriate amount of NMP were added to the second conductive material paste obtained as described above, and the disperser was used to perform stirring (3,000 rpm, 20 minutes) to yield a slurry for positive electrode-use. Table 1 shows the solid content concentration and the viscosity of the slurry for positive electrode-use, and also the result of evaluation of dispersion stability of the slurry for positive electrode-use. Note that in Tables 1 and 2, "Premixing" indicates a production method such as described above in which a slurry for positive electrode-use is produced through a first conductive material paste and a second conductive material paste.

<Production of Positive Electrode>

Aluminum foil of 20 μm in thickness was prepared as a current collector. The slurry for positive electrode-use obtained as described above was applied onto the aluminum foil using a comma coater such as to have a mass per unit area after drying of 20 mg/$cm^2$. The applied slurry for positive electrode-use was dried for 20 minutes at 90° C. and 20 minutes at 120° C., and was subsequently heat treated for 10 hours at 60° C. to obtain a positive electrode web. The positive electrode web was rolled by roll pressing to produce a positive electrode including the aluminum foil and a positive electrode mixed material layer having a density of 3.2 g/$cm^3$. The thickness of the positive electrode was 70 μm.

<Production of Slurry for Negative Electrode-Use and Negative Electrode>

A planetary mixer equipped with a disperser was charged with 100 parts of artificial graphite (volume average particle diameter: 24.5 μm) having a specific surface area of 4 $m^2$/g as a negative electrode active material and 1 part by solid content equivalents of a 1% carboxymethyl cellulose aqueous solution (BSH-12 produced by DKS Co., Ltd.) as a dispersant. After the solid content concentration had been adjusted to 55% using deionized water, mixing was performed for 60 minutes at 25° C. Next, the solid content concentration was adjusted to 52% using deionized water. Further mixing was performed for 15 minutes at 25° C. to yield a mixed solution.

Next, 1.0 parts by solid content equivalents of a 40% aqueous dispersion of styrene-butadiene copolymer (glass transition point −15° C.) and deionized water were added to the mixed solution obtained as described above, the final solid content concentration was adjusted to 50%, and further mixing was performed for 10 minutes. The resultant mixed solution was subjected to a defoaming process under reduced pressure to yield a slurry for negative electrode-use having good fluidity.

A comma coater was used to apply the slurry for negative electrode-use onto copper foil of 20 μm in thickness, which was used as a current collector, such as to have a thickness of approximately 150 μm after drying, and the applied slurry for negative electrode-use was dried. The drying was performed by conveying the copper foil inside a 60° C. oven for 2 minutes at a speed of 0.5 m/minute. Thereafter, heat treatment was performed for 2 minutes at 120° C. to obtain a negative electrode web. The negative electrode web was rolled by roll pressing to obtain a negative electrode including a negative electrode mixed material layer of 80 μm in thickness.

<Preparation of Separator>

A single-layer separator made from polypropylene (width 65 mm, length 500 mm, thickness 25 μm, produced by a dry method, porosity 55%) was cut out as a 5 cm×5 cm square.

<Production of Lithium Ion Secondary Battery>

An aluminum packing case was prepared as a battery case. The positive electrode obtained as described above was cut out as a 4 cm×4 cm square and was positioned such that a surface at the current collector side of the positive electrode was in contact with the aluminum packing case. The square separator obtained as described above was positioned on the surface of the positive electrode mixed material layer of the positive electrode. Next, the negative electrode obtained as described above was cut out as a 4.2 cm×4.2 cm square and was positioned on the separator such that a surface at the negative electrode mixed material layer-side of the negative electrode faced the separator. Furthermore, the aluminum packing case was filled with an $LiPF_6$ solution of 1.0 M in concentration that contained 1.5% of vinylene carbonate (VC). The solvent of the $LiPF_6$ solution was a mixed solvent of ethylene carbonate (EC) and ethyl methyl carbonate (EMC) (EC/EMC=3/7 (volume ratio)). The aluminum case was then closed with heat sealing at 150° C. to tightly seal up the opening of the aluminum packing, and a lithium ion secondary battery was accordingly produced.

High-voltage cycle characteristics and output characteristics of the produced lithium ion secondary battery were evaluated. The results are shown in Table 1.

Example 2

A slurry for positive electrode-use, a positive electrode, a negative electrode, and a lithium ion secondary battery were produced and evaluated in the same way as in Example 1 with the exception that, in the production of the slurry for positive electrode-use, $LiCoO_2$ particles having an oxide of Al on the surfaces thereof (coverage ratio 8%, average particle diameter (D50) 16 μm) were used as the positive electrode active material. The results are shown in Table 1.

Example 3

A slurry for positive electrode-use, a positive electrode, a negative electrode, and a lithium ion secondary battery were produced and evaluated in the same way as in Example 1 with the exception that, in the production of the slurry for positive electrode-use, Ketjenblack having a specific surface area of 800 $m^2/g$ was used as the conductive material. The results are shown in Table 1.

Examples 4 and 5

A slurry for positive electrode-use, a positive electrode, a negative electrode, and a lithium ion secondary battery were produced and evaluated in the same way as in Example 1 with the exception that, in the production of the slurry for positive electrode-use, the viscosity of the slurry for positive electrode-use was adjusted as shown in Table 1 by changing the conditions in mixing of the second conductive material paste, the positive electrode active material, and NMP by the disperser. The results are shown in Table 1.

Examples 6 and 7

A slurry for positive electrode-use, a positive electrode, a negative electrode, and a lithium ion secondary battery were produced and evaluated in the same way as in Example 1 with the exception that, in the production of the slurry for positive electrode-use, the viscosity and solid content concentration of the slurry for positive electrode-use were adjusted as shown in Table 1 by changing the conditions in mixing of the second conductive material paste, the positive electrode active material, and NMP by the disperser. The results are shown in Table 1.

Examples 8 and 9

A slurry for positive electrode-use, a positive electrode, a negative electrode, and a lithium ion secondary battery were produced and evaluated in the same way as in Example 1 with the exception that, in the production of the slurry for positive electrode-use, the solid content concentration was adjusted as shown in Table 1 by changing the amount of NMP added when combining the second conductive material paste and the positive electrode active material, and the conditions in mixing of the second conductive material paste, the positive electrode active material, and NMP by the disperser were changed (5 minutes at 1,500 rpm in Example 8 and 30 minutes at 3,500 rpm in Example 9). The results are shown in Table 1.

Example 10

A slurry for positive electrode-use, a positive electrode, a negative electrode, and a lithium ion secondary battery were produced and evaluated in the same way as in Example 1 with the exception that, in the production of the slurry for positive electrode-use, acetylene black (AcB) having a specific surface area of 70 $m^2/g$ was used as the conductive material and the solid content concentration was changed as shown in Table 1. The results are shown in Table 1.

Example 11

A positive electrode, a negative electrode, and a lithium ion secondary battery were produced and evaluated in the same way as in Example 1 with the exception that a slurry for positive electrode-use was produced by the procedure described below. The results are shown in Table 2.
<Production of Slurry for Positive Electrode-Use>

The slurry for positive electrode-use was obtained by using a disperser to mix (1,500 rpm, 5 minutes) 100 parts of $LiCoO_2$ particles having an oxide of Mg on the surfaces thereof (coverage ratio 1%, average particle diameter (D50) 16 μm) as a positive electrode active material, 1 part of Ketjenblack (KB; ECP600JD produced by Lion Corporation; specific surface area 1,270 $m^2/g$) as a conductive material, 0.1 parts by solid content equivalents of the NMP solution of the polymer (P1) (solid content concentration 8.0 mass %; composing 10% of the total of P1+P2), 0.9 parts by solid content equivalents of PVdF (KF Polymer #7200 produced by Kureha Corporation) as the fluorine-containing polymer (P2), and an appropriate amount of NMP. Note that in Table 2, "Collective mixing" indicates a production method such as described above in which a slurry for positive electrode-use is produced by collectively mixing all of the components.

Example 12

A slurry for positive electrode-use, a positive electrode, a negative electrode, and a lithium ion secondary battery were produced and evaluated in the same way as in Example 1 with the exception that, in the production of the slurry for positive electrode-use, the blending amount of the polymer (P1) was 0.5 parts (composing 50% of the total of P1+P2) and the blending amount of PVdF as the fluorine-containing polymer (P2) was 0.5 parts, the solid content concentration was adjusted as shown in Table 2, and the conditions in mixing of the second conductive material paste, the positive electrode active material, and NMP by the disperser were changed (10 minutes at 3,000 rpm). The results are shown in Table 2.

Example 13

A slurry for positive electrode-use, a positive electrode, a negative electrode, and a lithium ion secondary battery were produced and evaluated in the same way as in Example 1 with the exception that, in the production of the slurry for positive electrode-use, the blending amount of the polymer (P1) was 0.35 parts (composing 35% of the total of P1+P2) and the blending amount of PVdF as the fluorine-containing polymer (P2) was 0.65 parts, the solid content concentration was adjusted as shown in Table 2, and the conditions in mixing of the second conductive material paste, the positive electrode active material, and NMP were changed (15 minutes at 3,000 rpm). The results are shown in Table 2.

Example 14

A slurry for positive electrode-use, a positive electrode, a negative electrode, and a lithium ion secondary battery were produced and evaluated in the same way as in Example 1 with the exception that, in the production of the polymer (P1), 24 parts of AN, 27 parts of BA, and 49 parts of BD were used. The results are shown in Table 2.

Example 15

A slurry for positive electrode-use, a positive electrode, a negative electrode, and a lithium ion secondary battery were produced and evaluated in the same way as in Example 1 with the exception that, in the production of the polymer (P1), 40 parts of AN, 30 parts of BA, and 30 parts of BD were used. The results are shown in Table 2.

Example 16

A slurry for positive electrode-use, a positive electrode, a negative electrode, and a lithium ion secondary battery were produced and evaluated in the same way as in Example 15 with the exception that, in the production of the slurry for positive electrode-use, $LiCoO_2$ particles having an oxide of Mg on the surfaces thereof (coverage ratio 10%, average particle diameter (D50) 16 μm) were used as the positive electrode active material. The results are shown in Table 2.

Comparative Example 1

A slurry for positive electrode-use, a positive electrode, a negative electrode, and a lithium ion secondary battery were produced and evaluated in the same way as in Example 1 with the exception that, in the production of the slurry for positive electrode-use, $LiCoO_2$ particles (average particle diameter (D50) 20 μm) that did not have an oxide of a metal specified by the present disclosure on the surfaces thereof were used as the positive electrode active material. The results are shown in Table 2.

Comparative Example 2

A slurry for positive electrode-use, a positive electrode, a negative electrode, and a lithium ion secondary battery were produced and evaluated in the same way as in Example 1 with the exception that, in the production of the polymer (P1), 20 parts of AN, 30 parts of BA, 40 parts of BD, and 10 parts of methacrylic acid (MAA) as a hydrophilic group-containing monomer were used. The results are shown in Table 2.

TABLE 1

| | | | Example 1 | Example 2 | Example 3 | Example 4 | Example 5 |
|---|---|---|---|---|---|---|---|
| Positive electrode active material | Composite oxide particles | | $LiCoO_2$ | $LiCoO_2$ | $LiCoO_2$ | $LiCoO_2$ | $LiCoO_2$ |
| | Surface metal oxide | | Mg oxide | Al oxide | Mg oxide | Mg oxide | Mg oxide |
| | Coverage ratio (%) | | 1 | 8 | 1 | 1 | 1 |
| | Organic solvent | | NMP | NMP | NMP | NMP | NMP |
| Conductive material | Specific surface area (m²/g) | | 1270 | 1270 | 800 | 1270 | 1270 |
| | Type | | KB | KB | KB | KB | KB |
| Polymer (P1) | Nitrile group-containing monomer | Type | AN | AN | AN | AN | AN |
| | | Charged amount (mass %) | 20 | 20 | 20 | 20 | 20 |
| | (Meth)acrylic acid ester monomer | Type | BA | BA | BA | BA | BA |
| | | Charged amount (mass %) | 35 | 35 | 35 | 35 | 35 |
| | Conjugated diene monomer | Type | BD | BD | BD | BD | BD |
| | | Charged amount (mass %) | 45 | 45 | 45 | 45 | 45 |
| | Hydrophilic group-containing monomer | Type | — | — | — | — | — |
| | | Charged amount (mass %) | — | — | — | — | — |
| | Percentage composed of total of P1 + P2 (mass %) | | 10 | 10 | 10 | 10 | 10 |
| Fluorine-containing polymer (P2) | Type | | PVdF | PVdF | PVdF | PVdF | PVdF |
| | Slurry viscosity (mPa · s) | | 4000 | 4000 | 4000 | 1500 | 8000 |
| | Slurry solid content concentration (mass %) | | 79 | 79 | 79 | 79 | 79 |
| | Slurry production method | | Pre-mixing | Pre-mixing | Pre-mixing | Pre-mixing | Pre-mixing |
| | Slurry dispersion stability | | A | A | A | B | B |
| | Output characteristics | | A | A | B | C | C |
| | High-voltage cycle characteristics | | A | B | A | C | C |

| | | | Example 6 | Example 7 | Example 8 | Example 9 | Example 10 |
|---|---|---|---|---|---|---|---|
| Positive electrode active material | Composite oxide particles | | $LiCoO_2$ | $LiCoO_2$ | $LiCoO_2$ | $LiCoO_2$ | $LiCoO_2$ |
| | Surface metal oxide | | Mg oxide | Mg oxide | Mg oxide | Mg oxide | Mg oxide |
| | Coverage ratio (%) | | 1 | 1 | 1 | 1 | 1 |
| | Organic solvent | | NMP | NMP | NMP | NMP | NMP |
| Conductive material | Specific surface area (m²/g) | | 1270 | 1270 | 1270 | 1270 | 70 |
| | Type | | KB | KB | KB | KB | AcB |
| Polymer (P1) | Nitrile group-containing monomer | Type | AN | AN | AN | AN | AN |
| | | Charged amount (mass %) | 20 | 20 | 20 | 20 | 20 |

TABLE 1-continued

|  |  |  |  |  |  |  |  |
|---|---|---|---|---|---|---|---|
|  | (Meth)acrylic acid ester monomer | Type | BA | BA | BA | BA | BA |
|  |  | Charged amount (mass %) | 35 | 35 | 35 | 35 | 35 |
|  | Conjugated diene monomer | Type | BD | BD | BD | BD | BD |
|  |  | Charged amount (mass %) | 45 | 45 | 45 | 45 | 45 |
|  | Hydrophilic group-containing monomer | Type | — | — | — | — | — |
|  |  | Charged amount (mass %) | — | — | — | — | — |
|  | Percentage composed of total of P1 + P2 (mass %) |  | 10 | 10 | 10 | 10 | 10 |
| Fluorine-containing polymer (P2) | Type |  | PVdF | PVdF | PVdF | PVdF | PVdF |
|  | Slurry viscosity (mPa · s) |  | 2500 | 7000 | 4000 | 4000 | 4000 |
|  | Slurry solid content concentration (mass %) |  | 77 | 80 | 75 | 82 | 80 |
|  | Slurry production method |  | Pre-mixing | Pre-mixing | Pre-mixing | Pre-mixing | Pre-mixing |
|  | Slurry dispersion stability |  | B | B | B | A | A |
|  | Output characteristics |  | B | B | B | B | C |
|  | High-voltage cycle characteristics |  | B | B | B | B | B |

TABLE 2

|  |  |  | Example 11 | Example 12 | Example 13 | Example 14 | Example 15 |
|---|---|---|---|---|---|---|---|
| Positive electrode active material | Composite oxide particles |  | LiCoO$_2$ | LiCoO$_2$ | LiCoO$_2$ | LiCoO$_2$ | LiCoO$_2$ |
|  | Surface metal oxide |  | Mg oxide | Mg oxide | Mg oxide | Mg oxide | Mg oxide |
|  | Coverage ratio (%) |  | 1 | 1 | 1 | 1 | 1 |
|  | Organic solvent |  | NMP | NMP | NMP | NMP | NMP |
| Conductive material | Specific surface area (m$^2$/g) |  | 1270 | 1270 | 1270 | 1270 | 1270 |
|  | Type |  | KB | KB | KB | KB | KB |
| Polymer (P1) | Nitrile group-containing monomer | Type | AN | AN | AN | AN | AN |
|  |  | Charged amount (mass %) | 20 | 20 | 20 | 24 | 40 |
|  | (Meth)acrylic acid ester monomer | Type | BA | BA | BA | BA | BA |
|  |  | Charged amount (mass %) | 35 | 35 | 35 | 27 | 30 |
|  | Conjugated diene monomer | Type | BD | BD | BD | BD | BD |
|  |  | Charged amount (mass %) | 45 | 45 | 45 | 49 | 30 |
|  | Hydrophilic group-containing monomer | Type | — | — | — | — | — |
|  |  | Charged amount (mass %) | — | — | — | — | — |
|  | Percentage composed of total of P1 + P2 (mass %) |  | 10 | 50 | 35 | 10 | 10 |
| Fluorine-containing polymer (P2) | Type |  | PVdF | PVdF | PVdF | PVdF | PVdF |
|  | Slurry viscosity (mPa · s) |  | 8000 | 4000 | 4000 | 4000 | 4000 |
|  | Slurry solid content concentration (mass %) |  | 79 | 78 | 78 | 79 | 79 |
|  | Slurry production method |  | Collective | Pre-mixing | Pre-mixing mixing | Pre-mixing | Pre-mixing |
|  | Slurry dispersion stability |  | C | A | A | A | A |
|  | Output characteristics |  | C | B | B | A | B |
|  | High-voltage cycle characteristics |  | C | B | A | A | A |

|  |  |  | Example 16 | Comparative Example 1 | Comparative Example 2 |
|---|---|---|---|---|---|
| Positive electrode active material | Composite oxide particles |  | LiCoO$_2$ | LiCoO$_2$ | LiCoO$_2$ |
|  | Surface metal oxide |  | Mg oxide | — | Mg oxide |
|  | Coverage ratio (%) |  | 10 | — | 1 |
|  | Organic solvent |  | NMP | NMP | NMP |
| Conductive material | Specific surface area (m$^2$/g) |  | 1270 | 1270 | 1270 |
|  | Type |  | KB | KB | KB |
| Polymer (P1) | Nitrile group-containing monomer | Type | AN | AN | AN |
|  |  | Charged amount (mass %) | 40 | 20 | 20 |
|  | (Meth)acrylic acid ester monomer | Type | BA | BA | BA |
|  |  | Charged | 30 | 35 | 30 |

TABLE 2-continued

|  |  |  |  |  |  |
|---|---|---|---|---|---|
|  | Conjugated diene monomer | Type | BD | BD | BD |
|  |  | Charged amount (mass %) | 30 | 45 | 40 |
|  | Hydrophilic group-containing monomer | Type | — | — | MAA |
|  |  | Charged amount (mass %) | — | — | 10 |
|  | Percentage composed of total of P1 + P2 (mass %) |  | 10 | 10 | 10 |
| Fluorine-containing polymer (P2) |  | Type | PVdF | PVdF | PVdF |
|  | Slurry viscosity (mPa · s) |  | 4000 | 4000 | 4000 |
|  | Slurry solid content concentration (mass %) |  | 79 | 79 | 79 |
|  | Slurry production method |  | Pre-mixing | Pre-mixing | Pre-mixing |
|  | Slurry dispersion stability |  | A | A | C |
|  | Output characteristics |  | C | A | D |
|  | High-voltage cycle characteristics |  | A | D | D |

As shown by the above tables, in each of Examples 1-16, a good balance was achieved of excellent dispersion stability of the slurry for positive electrode-use, and excellent output characteristics and high-voltage cycle characteristics of the lithium ion secondary battery.

On the other hand, as shown by the above tables, in Comparative Example 1 in which a positive electrode active material was used that did not have an oxide of a metal specified by the present disclosure on the surface thereof, high-voltage cycle characteristics were extremely poor, and it was not possible to achieve a good balance of excellent dispersion stability of the slurry for positive electrode-use, and excellent output characteristics and high-voltage cycle characteristics of the lithium ion secondary battery. Furthermore, in Comparative Example 2 in which a polymer including at least 5 mass % of a hydrophilic group-containing monomer unit was used as the binding material, poor results were obtained for all of the evaluation categories.

Additionally, the following observations can be made from the tables shown above.

Examples 1, 2, 15, and 16 demonstrate that output characteristics and high-voltage cycle characteristics of the lithium ion secondary battery can be improved by changing the type and coverage ratio of the surface metal oxide that is present on the surface of the $LiCoO_2$.

Examples 1, 3, and 10 demonstrate that output characteristics and high-voltage cycle characteristics of the lithium ion secondary battery can be improved by changing the type and specific surface area of the conductive material. It is presumed that the small specific surface area of the conductive material in Example 10 caused poorer high-voltage cycle characteristics as a result of higher internal resistance.

Examples 1 and 4-9 demonstrate that dispersion stability of the slurry for positive electrode-use, and output characteristics and high-voltage cycle characteristics of the lithium ion secondary battery can be improved by adjusting the viscosity and solid content concentration of the slurry for positive electrode-use.

Examples 1 and 11 demonstrate that dispersion stability of the slurry for positive electrode-use, and output characteristics and high-voltage cycle characteristics of the lithium ion secondary battery can be improved by changing the production method of the slurry for positive electrode-use.

Examples 1, 12, and 13 demonstrate that output characteristics and high-voltage cycle characteristics of the lithium ion secondary battery can be improved by changing the blending ratio of the polymer (P1) and the fluorine-containing polymer (P2).

Examples 1, 14, and 15 demonstrate that output characteristics of the lithium ion secondary battery can be improved by changing the composition of the polymer (P1).

INDUSTRIAL APPLICABILITY

According to the present disclosure, it is possible to provide a slurry for lithium ion secondary battery positive electrode-use that has excellent dispersion stability and that can be used to form a positive electrode that enables a lithium ion secondary battery to exhibit excellent high-voltage cycle characteristics and output characteristics.

Moreover, according to the present disclosure, it is possible to provide a method for producing a slurry for lithium ion secondary battery positive electrode-use that has excellent dispersion stability and that can be used to form a positive electrode that enables a lithium ion secondary battery to exhibit excellent high-voltage cycle characteristics and output characteristics.

Furthermore, according to the present disclosure, it is possible to provide a method for producing a positive electrode for lithium ion secondary battery-use that enables a lithium ion secondary battery to exhibit excellent high-voltage cycle characteristics and output characteristics, and to provide a lithium ion secondary battery including a positive electrode produced by this production method.

The invention claimed is:

1. A slurry for lithium ion secondary battery positive electrode-use comprising
a positive electrode active material, a binding material, a conductive material, and an organic solvent, wherein
the positive electrode active material is a lithium cobalt-based composite oxide particle having an oxide of at least one metal selected from the group consisting of Mg, Ca, Al, B, Ti, and Zr on its surface,
the binding material includes a polymer (P1) and a fluorine-containing polymer (P2),
the polymer (P1) includes a nitrile group-containing monomer unit, a (meth)acrylic acid ester monomer unit, and an alkylene structural unit having a carbon number of at least 4, the alkylene structural unit is hydrogenated unit of conjugated diene derived monomer unit or 1-olefin monomer unit, the polymer (P1) includes 0 mass % or greater and less than 0.05 mass % of a hydrophilic group-containing monomer unit, and the hydrophilic group-containing monomer unit includes at least one of a carboxylic acid group-containing monomer unit, a sulfonate group-containing monomer unit, a phosphate group-contaning monomer unit, and a hydroxy group-containing monomer unit, and the polymer (P1) includes 2 mass % or greater and 50 mass % or less of the nitrile group-containing monomer unit, 10 mass % or greater and 40 mass % or less of the (meth)acrylic acid ester monomer unit, and 30 mass % or greater and 80 mass % or less of the alkylene structural unit having the carbon number of at least 4.

2. The slurry for lithium ion secondary battery positive electrode-use of claim 1, wherein the conductive material has a specific surface area of at least 700 m$^2$/g.

3. The slurry for lithium ion secondary battery positive electrode-use of claim 1, having a viscosity of from 1,500 mPa·s to 8,000 mPa·s.

4. The slurry for lithium ion secondary battery positive electrode-use of claim 1, having a solid content concentration of from 75 mass % to 82 mass %.

5. The slurry for lithium ion secondary battery positive electrode-use of claim 1, wherein the conductive material is Ketjenblack.

6. The slurry for lithium ion secondary battery positive electrode-use of claim 1, wherein the polymer (P1) has an iodine value of at least 3 mg/100 mg and no greater than 60 mg/100 mg.

* * * * *